(12) United States Patent
Lin

(10) Patent No.: US 7,374,469 B2
(45) Date of Patent: May 20, 2008

(54) METHOD OF MAKING A TOY BALL

(76) Inventor: Chia-Yen Lin, 6F, No. 82, Sec. 2, Jianguo Borth Rd., Taipei (TW)

( * ) Notice: Subject to any disclaimer, the term of this patent is extended or adjusted under 35 U.S.C. 154(b) by 423 days.

(21) Appl. No.: 11/251,742

(22) Filed: Oct. 15, 2005

(65) Prior Publication Data

US 2007/0085245 A1    Apr. 19, 2007

(51) Int. Cl.
  *A63H 15/04*    (2006.01)
  *A63H 7/00*    (2006.01)
(52) U.S. Cl. .................. 446/273; 446/269; 446/409; 473/594; 264/275; 264/271.1
(58) Field of Classification Search ............... 446/273, 446/409; 473/594; 264/311, 271.1, 275
See application file for complete search history.

(56) References Cited

U.S. PATENT DOCUMENTS

| | | | | |
|---|---|---|---|---|
| 955,435 A | * | 4/1910 | Reed | 446/273 |
| 2,351,762 A | * | 6/1944 | Hoover | 446/269 |
| 2,519,248 A | * | 8/1950 | Hulbert | 446/273 |
| 4,116,439 A | * | 9/1978 | Chavarria et al. | 473/52 |
| 4,203,251 A | * | 5/1980 | Malek et al. | 446/289 |
| 4,214,753 A | * | 7/1980 | Haber et al. | 473/52 |
| 6,217,806 B1 | * | 4/2001 | Baxley | 264/273 |
| 2005/0143204 A1 | * | 6/2005 | Lin | 473/594 |

* cited by examiner

*Primary Examiner*—Eugene Kim
*Assistant Examiner*—Urszula M Cegielnik

(57) ABSTRACT

A method of making a toy ball having a toy figurine fixed therein includes the steps of: preparing an upper mold and a lower mold; preparing a toy figurine; inserting and fixing the toy figurine to an iron needle of the lower mold; injecting liquid polyurethane glue into the upper mold, combing the lower mold with the upper mold, and turning the combined mold upside down; placing the combined mold on a rotational molding machine for spin-molding the polyurethane glue; cooling the liquid polyurethane glue, and then opening the upper mold and taking out the toy ball from the lower mold; injecting liquid doping with glitter powder or fluorescent powder into the toy ball; sealing a through hole of the toy ball using a plastic sealing needle and then cutting a part of the plastic sealing needle that remains outside the toy ball.

11 Claims, 7 Drawing Sheets

METHOD OF MAKING A TOY BALL

BACKGROUND OF THE INVENTION

1. Field of the Invention

The present invention relates to a method of making a toy ball, which is a hollow ball having a figure fixed therein, such as a toy figurine, a plaything and an animal figure, and is manufactured using spin-molding and specific fixation of the figure to an inside of the toy ball so that the figure inside the toy ball can sway when the ball is shaken or hit.

2. The Prior Arts

A conventional toy ball is embedded with a figure and/or a circuit board therein so as to create a specific visual effect and/or give out sound and light. A method of making a toy ball in accordance with the prior art comprises steps of: first, fixing a figure or a circuit board to a round ball mold; and then, injecting foamed plastic material or rubber into the ball mold to completely enclose the figure or the circuit board and thus form a round solid ball. Hence, the figure inside the solid ball cannot sway relative to the ball when the ball is shaken or hit. In addition, the bounce of the conventional solid ball cannot be adjusted by injecting different amount of liquid into the ball to form different pressure inside; and the solid ball cannot also be filled with flowable liquid doping with glitter powder or fluorescent powder for creating a specific visual effect.

Thus, it is desired to provide a method of making a toy ball having a figure fixed therein and able to sway at random to solve the above-mentioned problems.

SUMMARY OF THE INVENTION

Since a toy figurine is embedded in a solid toy ball in prior designs and thus cannot sway at random, the objective of the present invention is to provide a method of making a toy ball, which is a hollow ball having a toy figurine fixed therein and able to sway at random when the toy ball is shaken or hit.

To achieve the above-mentioned objectives, a method of making a toy ball in accordance with the present invention, which is manufactured using spin-molding and specific fixation of a toy figure to an inside of the toy ball, comprises the steps of: preparing an upper mold and a lower mold, in which an iron needle is inserted into a needle seat of the lower mold; preparing a toy figurine having a plastic supporting rod integrally formed thereon and an insertion hole for mounting with the iron needle of the lower mold; inserting and fixing the toy figurine through the insertion hole thereof to the iron needle of the lower mold; injecting liquid polyurethane glue into the upper mold, combing the lower mold with the upper mold, and turning the combined mold upside down; placing the combined mold on a rotational molding machine for spin-molding the polyurethane glue to a predetermined thickness, which suitably covers the plastic supporting rod so as to securely fix the toy figurine to the toy ball; cooling the liquid polyurethane glue, and then opening the upper mold and taking out the toy ball from the lower mold; injecting liquid doping with glitter powder or fluorescent powder into the toy ball through a through hole thereof; sealing the through hole of the toy ball using a plastic sealing needle and then cutting a part of the plastic sealing needle that remains outside the toy ball.

BRIEF DESCRIPTION OF THE DRAWINGS

The present invention will be apparent to those skilled in the art by reading the following detailed description of preferred embodiments thereof, with reference to the attached drawings, in which.

DETAILED DESCRIPTION OF THE PREFERRED EMBODIMENT

Figure 1:
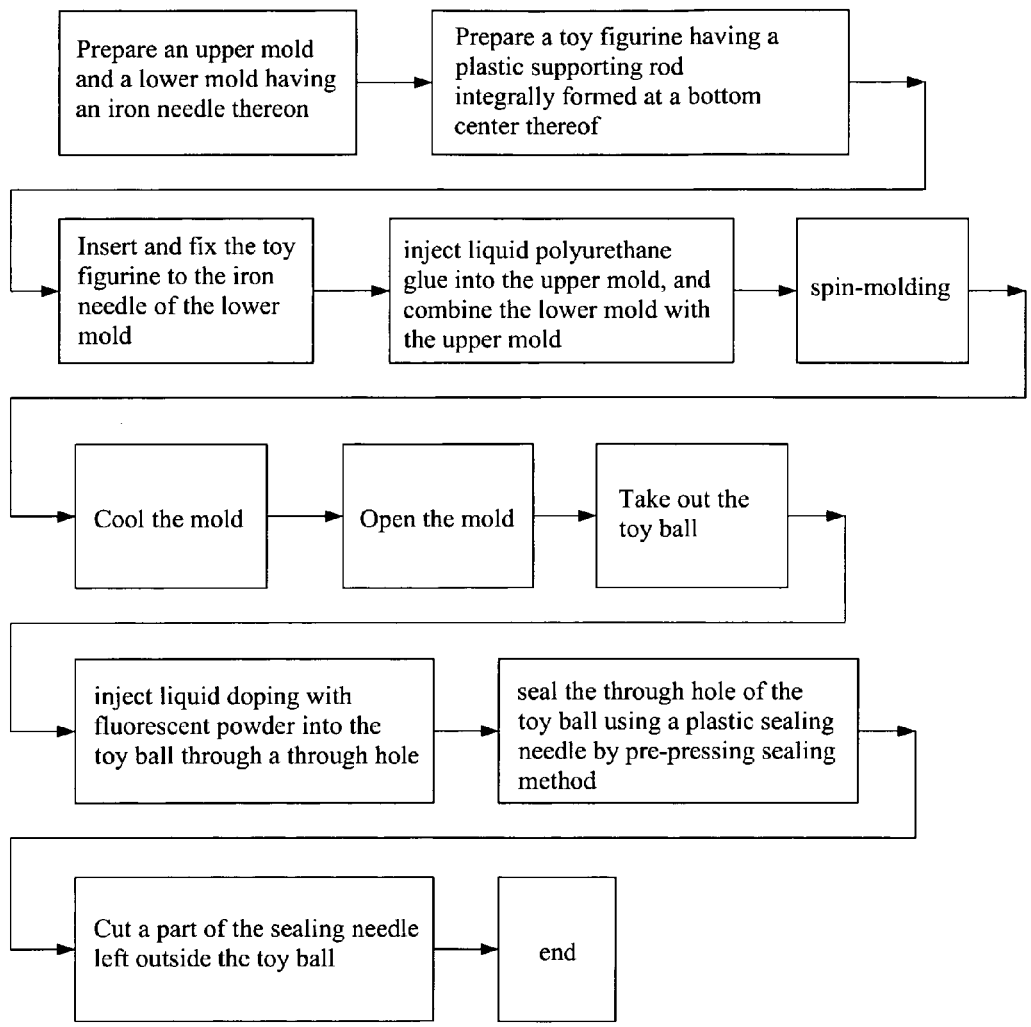
FIG. 1 is a flow chart illustrating a method of making a toy ball in accordance with the present invention.
Figure 2:
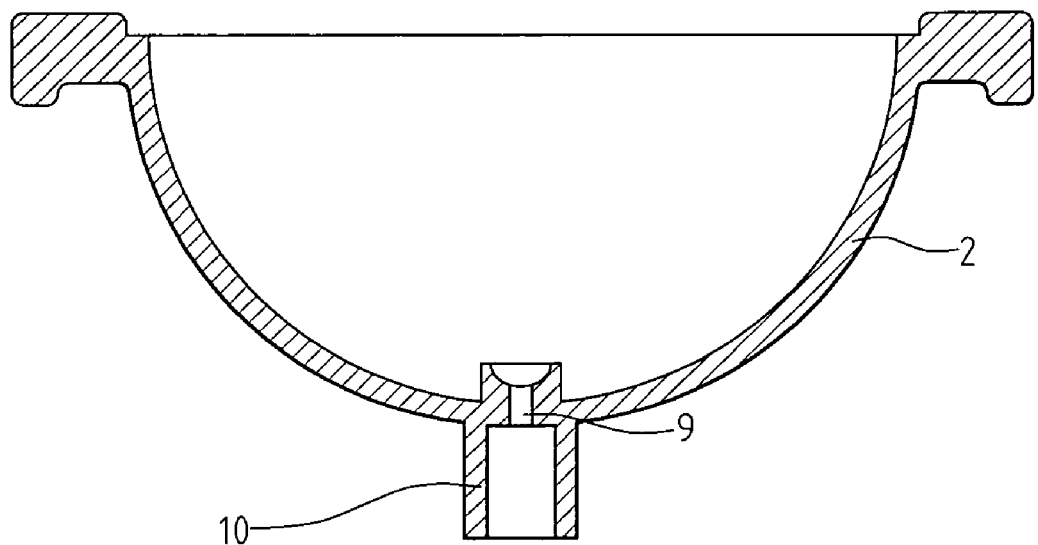
FIG. 2 is a sectional view of a lower mold in accordance with the present invention.
Figure 3:
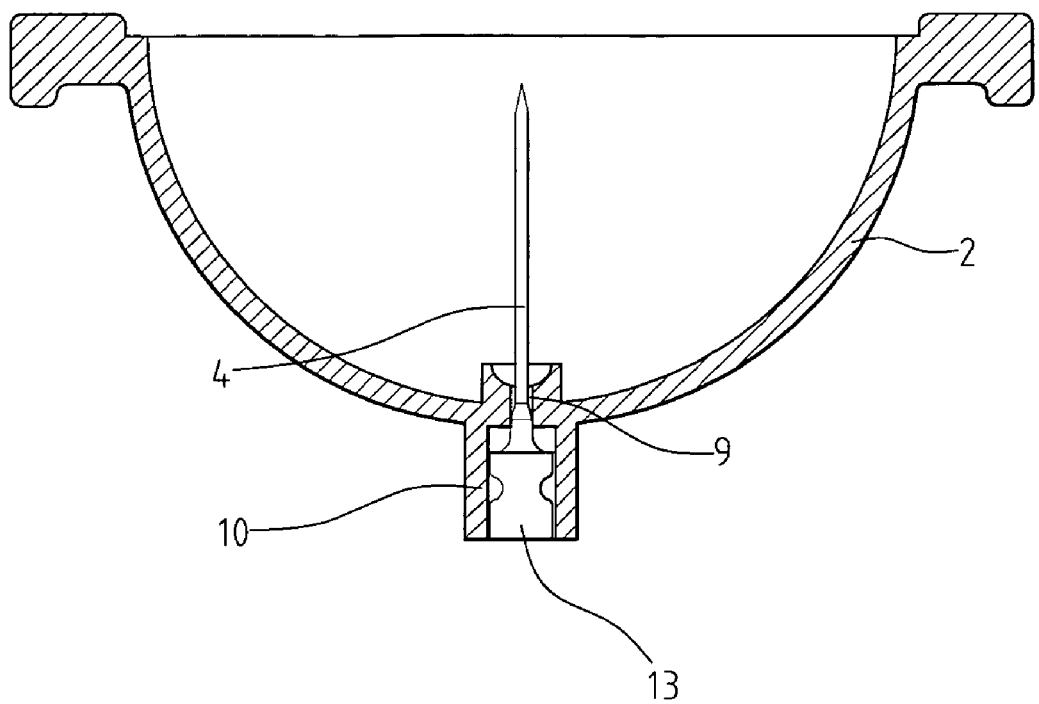
FIG. 3 is a sectional view of the lower mold, into which an iron needle is inserted, in accordance with the present invention.
Figure 4:
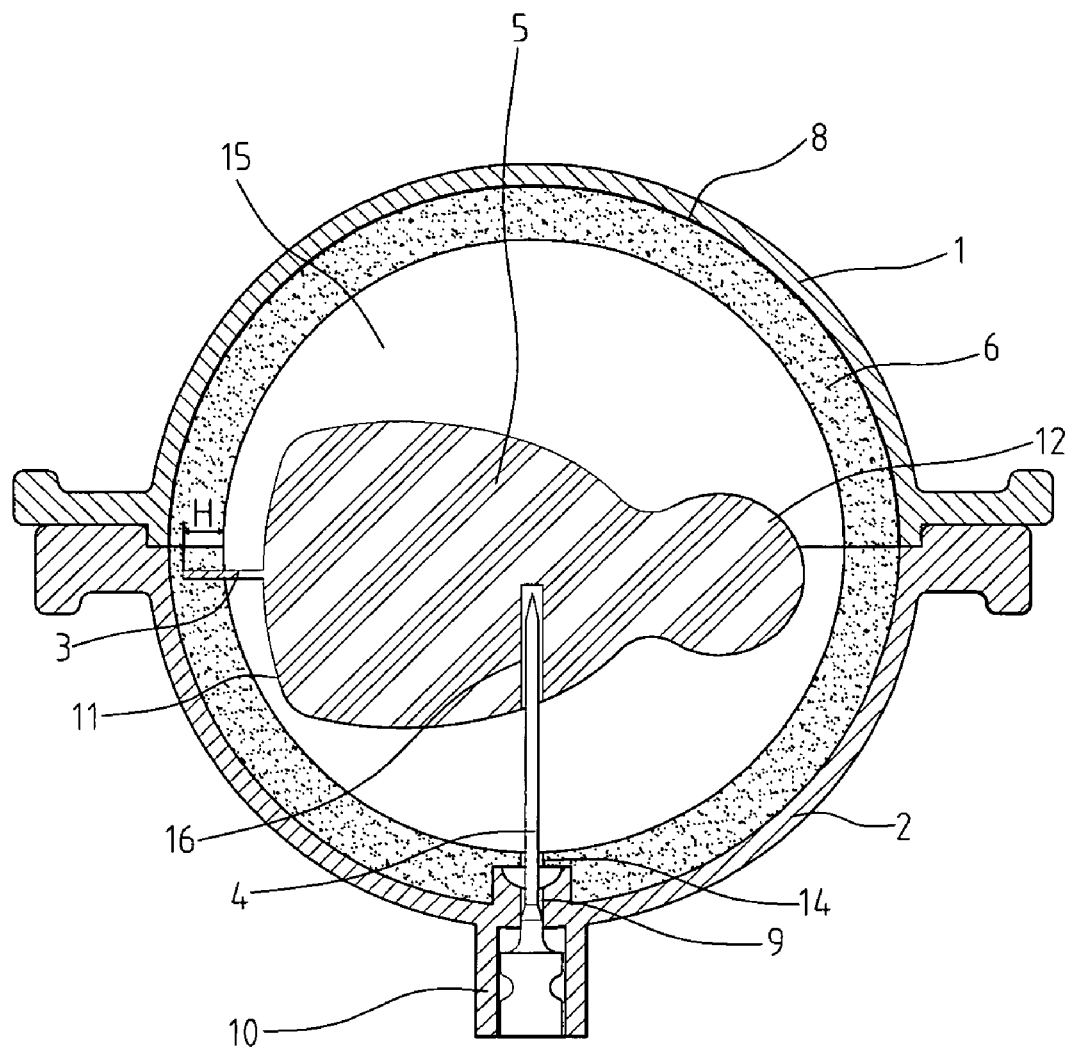
FIG. 4 is a sectional view of a toy ball having a toy figurine with a plastic supporting rod fixed to the ball, which are in whole received in a mold, in accordance with the present invention.
Figure 5:
FIG. 5 is a schematic view showing the iron needle, the plastic supporting rod and a plastic sealing needle of the present invention.
Figure 5:
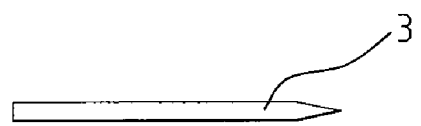
Figure 5:
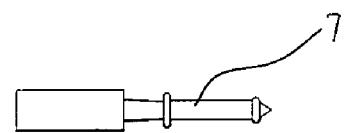
Figure 6:
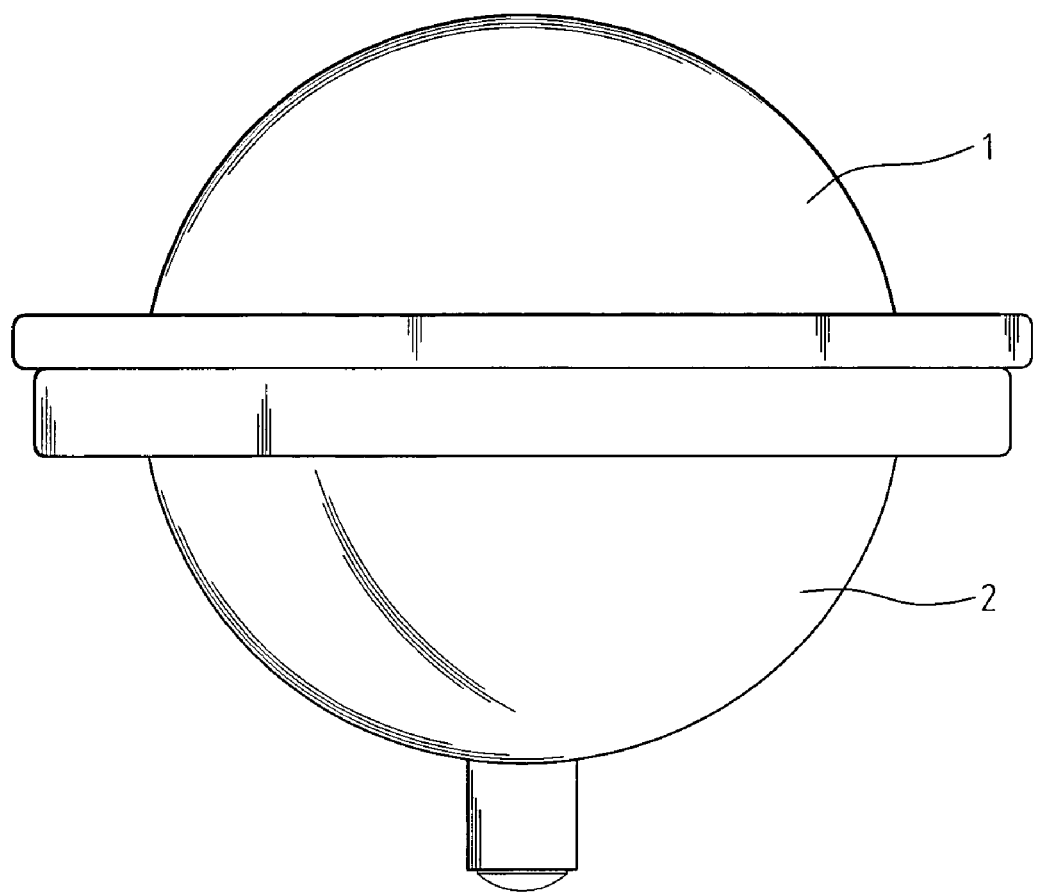
FIG. 6 is a schematic view illustrating that the lower mold is combined with a upper mold of the present invention.
Figure 7:
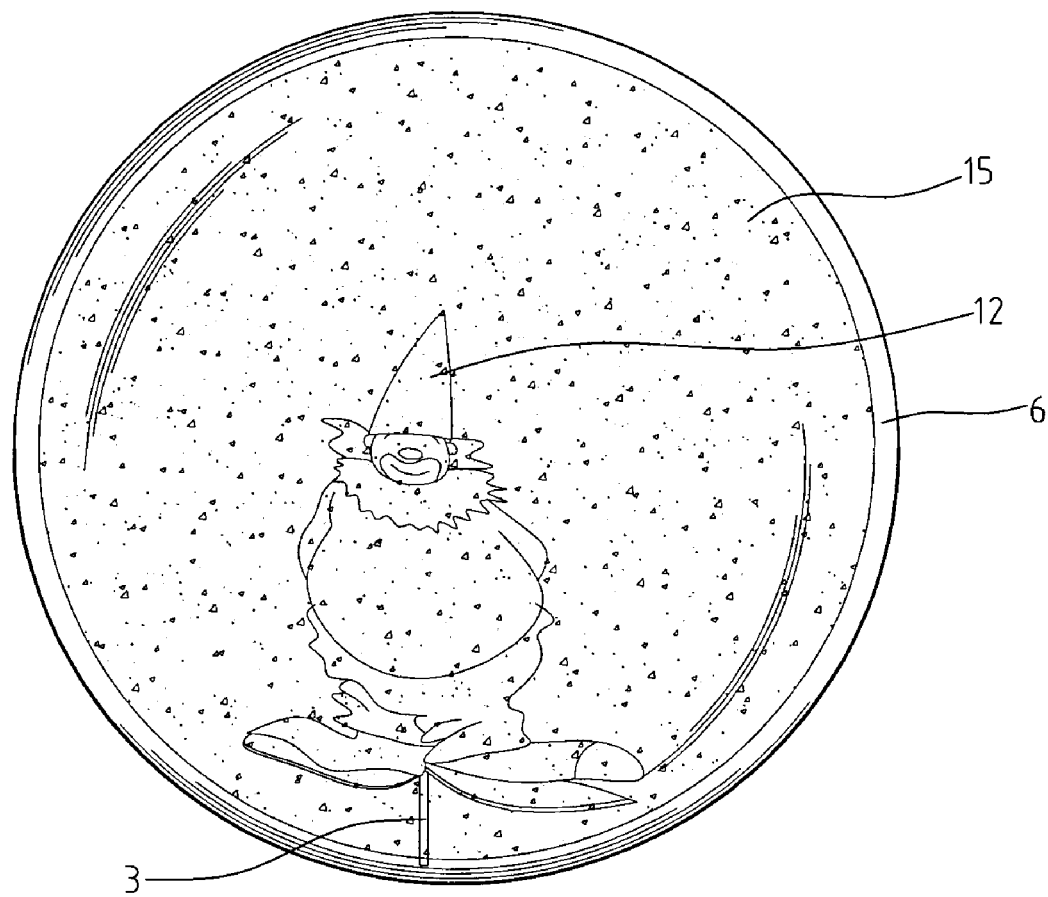
FIG. 7 illustrates a finished toy ball of the present invention.

With reference to the drawings, and in particular to FIG. 1, a method of making a toy ball in accordance with the present invention comprises the steps of:

(a) Preparing an upper semi-spherical mold 1 and a lower semi-spherical mold 2 (see FIGS. 3 and 6), in which the lower mold 2 has a needle seat 10 having a needle hole 9 at a lowest point of a semi-spherical surface of the lower mold 2 for mounting with an iron needle 4;

(b) Inserting and mounting the iron needle 4 having a needle stand 13 to the needle seat 10 of the lower mold 2 (see FIGS. 2 and 3);

(c) Preparing a toy figurine 5 having a head portion 12 and a body portion 11, in which the body portion 11 has a plastic supporting rod 3 integrally formed at a bottom center thereof and an insertion hole 16 provided at a back thereof perpendicular to the plastic supporting rod 3 for mounting with the iron needle 4 of the lower mold 2 (see FIG. 4);

(d) Inserting and fixing the toy figurine 5 through the insertion hole 16 thereof to the iron needle 4 of the lower mold 2;

(e) Injecting liquid polyurethane glue, which is composed of prepolymer and chain extender, into the upper mold 1 taking about 1 second; combining the lower mold 2 with the upper mold 1 about 2 seconds; and turning the combined mold 180 degree making the upper mold 1 at top position and the lower mold 2 at bottom position (see FIG. 6) about 1-2 seconds, and in total less than 5 seconds;

(f) placing the combined mold on a rotational molding machine for spin-molding the polyurethane glue about 3-30 minutes depending on the curing time after the mixing of the prepolymer and the chain extender, in which the polyurethane glue is increasingly pushed to a mold wall 8 of the combined mold, due to centrifugal force, to form a ball shell 6, which increasingly covers the plastic supporting rod 3 with a thickness of H depending on the injection quantity of the polyurethane glue and the length of the plastic supporting rod 3 (see FIG. 4);

(g) Cooling the combined mold at room temperature for 24 hours or by chilled water for 12 hours;

(h) Opening the upper mold 1 and taking out the toy ball from the lower mold 2;

(i) Injecting liquid 15 doping with glitter powder or fluorescent powder into the toy ball through a through hole 14 thereof (see FIGS. 4 and 7), in which the hardness and bounce of the toy ball can be controlled by controlling the injection quantity of the liquid 15;

(j) Sealing the through hole 14 of the toy ball in water using a plastic sealing needle 7 (see FIG. 5), namely, sealing the toy ball by pre-pressing sealing method, whereby the liquid 15 will not leak during the sealing operation due to the balance between the water pressure and the liquid pressure inside the toy ball; and (k) Cutting a part of the inserted plastic sealing needle 7 that remains outside the toy ball, to get the toy ball as shown in FIG. 7, in which the plastic sealing needle 7 has a length about 2 cm, the length of the inserted part into the through hole 14 of the toy ball is about 0.8 cm, and the remaining part outside the toy ball is about 1.2 cm.

The above steps of making a toy ball in accordance with the present invention can be modified or changed. For example, at the step (c) of the present invention, the plastic supporting rod 3 integrally formed on the toy figurine 5 (see FIG. 5) may be separately manufactured and then inserted into a pre-set insertion hole (not shown) on a bottom center of the toy figurine 5. The plastic supporting rod 3 may be made by changing the material to offer the toy figurine 5 different levels of sway due to different elasticity. Further, at the step (c) of the present invention, the toy figurine in shape or pattern may be different. Next, at the step (i) of the present invention, the liquid 15 doping with glitter powder or fluorescent powder may be pure water, or changed to mineral oils, brine, polymeric transparent liquids or edible oils having a lower freezing point so as to prevent it from being frozen in winter and thus resulting in losing its elasticity; and at the step (e) of the present invention, essences or fluorescent powder may be added to the prepolymer or the chain extender to make the polyurethane ball smell good or give out fluorescence at night.

While we have shown and described the embodiments in accordance with the present invention, it should be clear to those skilled in the art that further embodiments may be made without departing from the scope of the present invention.

What is claimed is:

1. A method of making a toy ball, comprising the steps of:
   (a) preparing an upper mold and a lower mold, in which an iron needle is inserted into a needle seat of the lower mold;
   (b) preparing a toy figurine having a plastic supporting rod integrally formed at a bottom center thereof and an insertion hole for mounting with the iron needle of the lower mold;
   (c) inserting and fixing the toy figurine through the insertion hole thereof to the iron needle of the lower mold;
   (d) injecting liquid polyurethane glue into the upper mold, combing the lower mold with the upper mold, and turning the combined mold upside down;
   (e) placing the combined mold on a rotational molding machine for spin-molding the polyurethane glue to a predetermined thickness, which suitably covers the plastic supporting rod so as to securely fix the toy figurine to the toy ball;
   (f) cooling the liquid polyurethane glue, and then opening the upper mold and taking out the toy ball from the lower mold;
   (g) injecting liquid doping with glitter powder or fluorescent powder into the toy ball through a through hole thereof;
   (h) sealing the through hole of the toy ball using a plastic sealing needle and then cutting a part of the plastic sealing needle that remains outside the toy ball.

2. The method as claimed in claim 1, wherein the plastic supporting rod integrally formed on the toy figurine may be separately manufactured and then inserted into a pre-set insertion hole on the toy figurine.

3. The method as claimed in claim 1, wherein the liquid polyurethane glue is composed of prepolymer and chain extender.

4. The method as claimed in claim 1, wherein the injection quantity of the liquid polyurethane glue can be adjusted to control a covering depth of the plastic supporting rod.

5. The method as claimed in claim 1, wherein the step (f) of cooling the liquid polyurethane glue can be operated at room temperature or by chilled water cooling.

6. The method as claimed in claim 1, wherein in the step (g), the injection quantity of the liquid doping with glitter powder or fluorescent powder into the toy ball can be adjusted to control the pressure inside the toy ball.

7. The method as claimed in claim 1, wherein in the step (g), the liquid doping with glitter powder or fluorescent powder is pure water.

8. The method as claimed in claim 1, wherein in the step (g), the liquid doping with glitter powder or fluorescent powder can be mineral oils, brine, polymeric transparent liquids or edible oils.

9. The method as claimed in claim 1, wherein the step (h) of sealing the through hole of the toy ball is operated in water.

10. The method as claimed in claim 1, wherein the plastic supporting rod can be made by changing the material to offer the toy figurine different levels of sway.

11. The method as claimed in claim 3, wherein essences or fluorescent powder can be added to the prepolymer or the chain extender to make the toy ball smell good or give out fluorescence at night.

* * * * *